United States Patent
Chen et al.

(10) Patent No.: US 7,408,889 B2
(45) Date of Patent: Aug. 5, 2008

(54) DYNAMIC TUNNELING PEERING WITH PERFORMANCE OPTIMIZATION

(75) Inventors: Maoke Chen, Beijing (CN); Hui Huang, Beijing (CN); Xing Li, Beijing (CN); Cheng Yan, Beijing (CN); Xin Liu, Beijing (CN)

(73) Assignee: Nokia Corporation, Espoo (FI)

( * ) Notice: Subject to any disclaimer, the term of this patent is extended or adjusted under 35 U.S.C. 154(b) by 917 days.

(21) Appl. No.: 10/681,122

(22) Filed: Oct. 9, 2003

(65) Prior Publication Data

US 2004/0100953 A1 May 27, 2004

Related U.S. Application Data

(60) Provisional application No. 60/417,651, filed on Oct. 11, 2002.

(51) Int. Cl.
*H04L 12/18* (2006.01)
(52) U.S. Cl. ...................................................... 370/254
(58) Field of Classification Search .................. None
See application file for complete search history.

(56) References Cited

U.S. PATENT DOCUMENTS

| | | | |
|---|---|---|---|
| 5,727,051 A | * | 3/1998 | Holender ............... 379/112.05 |
| 5,926,462 A | | 7/1999 | Schenkel et al. |
| 6,275,470 B1 | * | 8/2001 | Ricciulli ..................... 370/238 |
| 6,363,319 B1 | * | 3/2002 | Hsu ............................ 701/202 |
| 2003/0099237 A1 | * | 5/2003 | Mitra et al. ................ 370/393 |
| 2004/0013130 A1 | * | 1/2004 | Blanchet et al. ............ 370/466 |

FOREIGN PATENT DOCUMENTS

| | | |
|---|---|---|
| EP | 1 063 819 B1 | 12/2000 |
| WO | WO 00 79730 A | 12/2000 |
| WO | WO 02/23807 A2 | 3/2002 |

OTHER PUBLICATIONS

Durand et al, RFC 3053, IPv6 Tunnel Broker, pp. 1-13, Jan. 2001.*
Zwick, All Pair Shortest Path using Bridging Sets and Rectangular Matrix Multiplication, downloadable at http://www.citeseer.htm, pp. 1-27, Aug. 2000.*

* cited by examiner

*Primary Examiner*—Frank Duong
(74) *Attorney, Agent, or Firm*—Squire Sanders & Dempsey L.L.P.

(57) ABSTRACT

A method and network system for configuring connections between a plurality of network nodes, wherein each pair of network nodes is connected via virtual direct connections. The invention includes performing quality measurements of the virtual direct connections between each pair of the network nodes, and deciding, based on the results of the quality measurements, whether a virtual direct connection is to be used for conveying data or not, wherein the results of the quality measurements are transmitted to a network configuration control element which performs the deciding step.

37 Claims, 6 Drawing Sheets

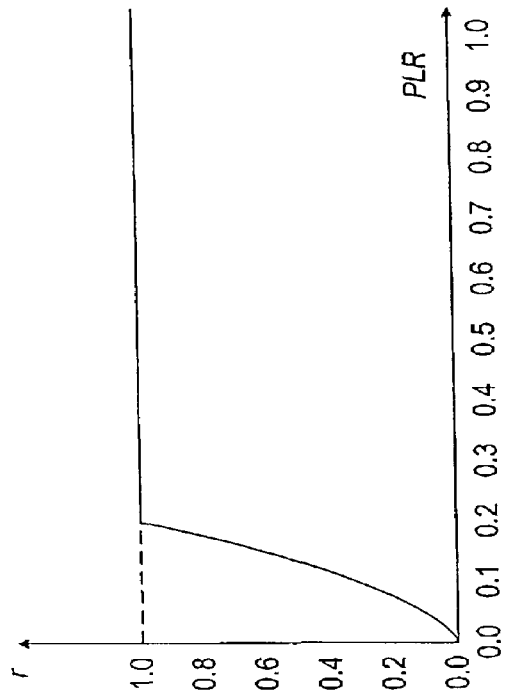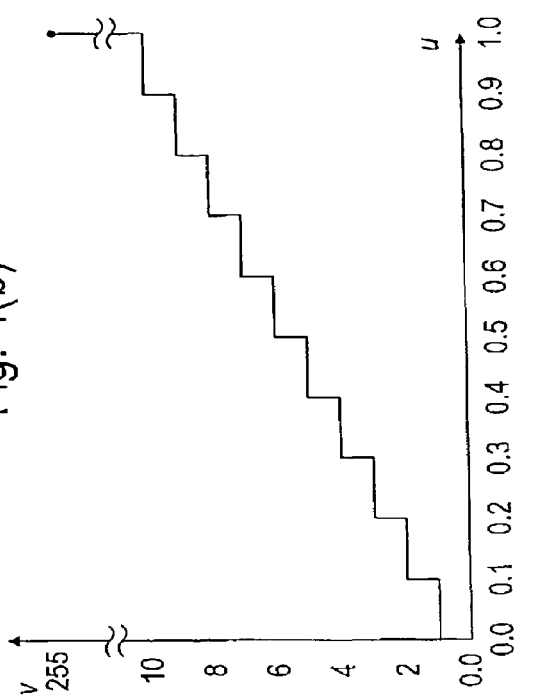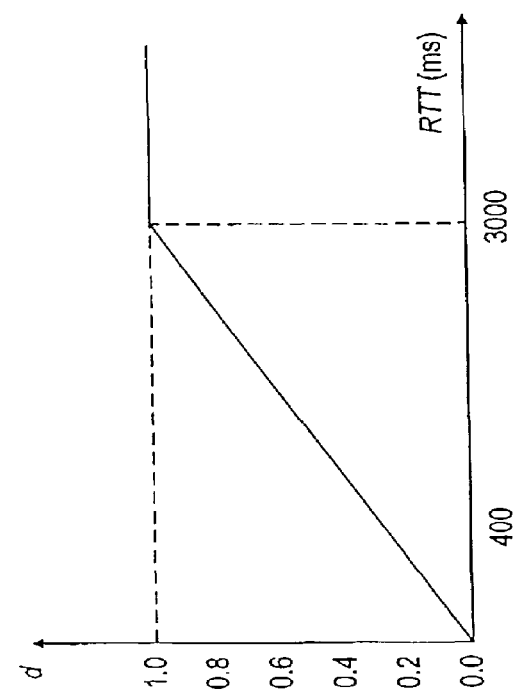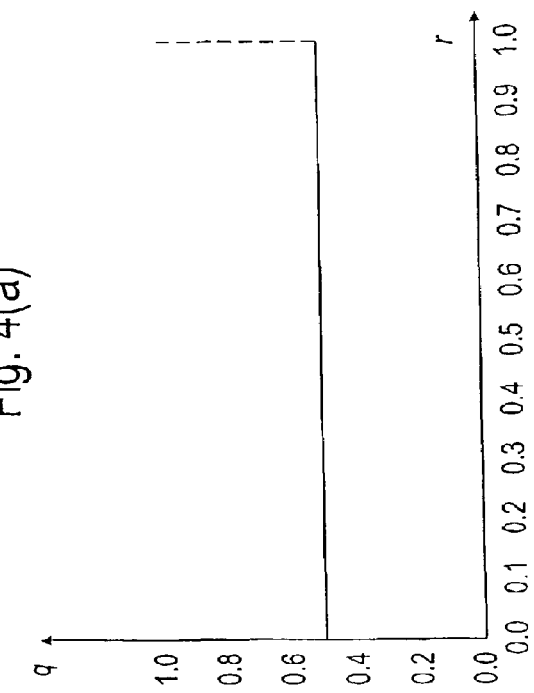
Fig. 4(a)
Fig. 4(b)
Fig. 4(c)
Fig. 4(d)

DYNAMIC TUNNELING PEERING WITH PERFORMANCE OPTIMIZATION

The present application claims the benefit of priority of provisional application Serial No. 60/417,651, filed Oct. 11, 2002, the contents of which are incorporated herein by reference.

FIELD OF THE INVENTION

The present invention relates to a method and a network system for configuring connections between a plurality of network nodes.

BACKGROUND OF THE INVENTION

There are a plurality of networks of different types, i.e., networks with different protocols, such as IPv4 (Internet protocol version 4) and IPv6 (Internet protocol version 6). Some of these networks are widely used, such that they cover a large area (e.g., IPv4 Internet). Other networks are only applied on isolated spots (e.g., IPv6 Internet, which is currently only used on isolated sites). It is desired to connect these isolated networks of the same type. For this connection, a "tunnel" concept has been proposed. A tunnel is a virtual link between two network nodes. That is, tunnelling works by encapsulating a protocol of the first network within packets carried by the second network. In case of IPv6 and IPv4 this means that IPv6 protocol is embedded within the IPv4 packets. Another example is Virtual Private Network (VPN). In this case, organizations are enabled to use the Internet to transmit data across the VPN. This is performed by embedding the VPN network protocol within the TCP/IP packets carried by the Internet. Hence, such tunnels are playing important roles in virtual internetworking. Heretofore, configuration of the tunnels was carried out manually, which is troublesome and requires a lot of work. To overcome the low efficiency of such a manual tunnel configuration, some automatic tunnelling approaches, such as Tunnel Broker (TB) (see, e.g., A. Durand, P. Fasano, D. Lento, "IPv6 Tunnel Broker", RFC 3053, January 2001) and 6to4 implicit stateless tunnel (see. e.g., B. Carpenter, K. Moore, "Connection of IPv6 Domains via IPv4 Clouds", RFC 3056, February 2001), have been developed and deployed in IPv6 networking. In VPN (Virtual Private Network) techniques, tunnels combine all the nodes scattering among geographically different sites as a uniform logical network.

The connection mechanism of IPv6 domains via IPv4 clouds mentioned above is a stateless solution for automatic tunnelling IPv6 "islands" separated by IPv4 "seas", in virtue of a specified IPv6 address format. Logically, each pair of peer sites in 6to4 is connected directly in the virtual network sense, i.e. is not any IPv6 relay between the peers and the virtual network (VN) forms a full-mesh topology. As IPv6 packets are sent from each peer to another via IPv4 routers only, the performance of an IPv6 session is the same as that on the IPv4 end-to-end path between the corresponding nodes.

In the Tunnel Broker approach, the stateful broker services make the addressing flexible. However, in the Tunnel Broker system, a Tunnel Server (TS) of a relay centre for a group of Tunnel Clients is provided. Each Tunnel Client (TC) has a default route to the other part of the IPv6 world via the Tunnel Server, and each pair of Tunnel Clients must communicate via the Tunnel Server's relay definitely, even when directly tunnelling the two Tunnel Clients may be far better. Then the performance of an IPv6 session between two Tunnel Clients depends on end-to-end behaviour between the Tunnel Server to both of them.

Both methods mentioned above do not provide the capability of dynamic tunnel change according to the performance behaviour of virtual link (tunnel).

However, up to now, no existing tunnel technique includes consideration of the performance problem, i.e. matching the virtual networking process to the performance and its variation over the IPv4 infrastructure.

SUMMARY OF THE INVENTION

The object underlying the present invention resides in providing a method and a system by which virtual connections between network nodes can reliably and efficiently be configured. This object is solved by a method for configuring connections between a plurality of network nodes, wherein each pair of the network node is connected via virtual direct connections, the method comprising the steps of performing quality measurements of the virtual direct connections between each pair of the network nodes, and deciding, based on the results of the quality measurements, whether a virtual direct connection is to be used for conveying data or not, wherein the results of the quality measurements are transmitted to a network configuration control element which performs the deciding step. Alternatively, the above object is solved by a network system comprising a plurality of network nodes and a network configuration control element, wherein each pair of the network node is connected via virtual direct connections, wherein the network nodes are adapted to perform quality measurements of the virtual direct connections and to send results of the quality measurements to the network configuration control element, and the network configuration control element is adapted to decide, based on the results of the quality measurements, whether a virtual direct connection is to be used for conveying data or not.

Thus, it is possible to monitor the quality of virtual direct connections (e.g., tunnels) between the network nodes. Hence, tunnelling between the network nodes can be performed reliably.

In particular, the worst logical links can be excluded according to a current end-to-end performance of the first network (i.e., the base network).

Since a plurality of virtual direct connections (e.g., tunnels) are provided between the network nodes, there is a high redundancy such that connections between network nodes can also be established via other networks.

In the deciding step, in case it is decided that between two network nodes no virtual direct connection is usable, a route between these two network nodes via at least one other network node may be determined based on the results of the quality measurements.

In this way, the so-called "next hop" can be determined easily, by which a secure and fast connection can be established.

The network nodes may be tunnel-end-points and the virtual direct connection between each pair of the network nodes may be tunnels, the tunnels providing virtual connections between the nodes by encapsulating a first type network protocol within data carried by a second type network. The quality measurements may be performed by each network node with respect to virtual direct connections to other network nodes. Thus, it is possible to get results for all the tunnels involved in order to obtain an accurate decision. The quality measurements may comprise measurement of a delay time on a virtual direct connection between two network nodes.

A threshold for a maximum allowable delay time may be set such that, when a delay time on a virtual direct connection exceeds the threshold, the connection is determined as not being usable.

Thus, a maximum allowable delay time may be set. Hence, a virtual direct connection may be considered as being unusable no matter whether the virtual direct connection shows good quality in other aspects (e.g., in a data loss rate).

Moreover, the quality measurements may comprise a measurement of a data loss rate on a virtual direct connection between two network nodes. Here, the data loss rate may be a packet loss rate, for example, in case of a packet switched network.

A threshold for a maximum allowable data loss rate may be set such that, when a data loss rate on a virtual direct connection exceeds the threshold, the virtual direct connection is determined as not being usable.

Thus, a maximum data loss rate (e.g., packet loss rate) may be set. Hence, a virtual direct connection may be considered as being unusable no matter whether the virtual direct connection shows good quality in other aspects (e.g., in a delay time).

The quality measurement may comprise both of the above delay time measurement and data loss rate measurement. Then, result of the delay time measurement and a result of the data loss rate measurement may be combined to a single quality measurement result.

In this way, an easy handling of the measurement results is possible, since only the combined measurement result has to be processed further, and not two separate values.

The result of the delay time measurement and the result of the data loss rate measurement may be respectively weighted on combining them. Thus, a network operator can decide and freely set which one of delay time or data loss rate is more important to him.

On combining, the delay time measurement result and the packet data loss rate measurement result may be normalized, respectively. Thus, both results are converted into a dimensionless value, which can easily be compared to other results of other virtual direct connections.

The single quality measurement result may be converted into an integer value. In this way, the traffic in the network may be reduced since floating-point numbers require more data.

The measurement and the decision on the virtual direct connections may be performed on predetermined intervals. The measurement and the decision on the virtual direct connections may be also performed when there are some changes in the network configurations. This also reduces the traffic amount and the calculation load, since in this way measurement and decision do not take place continuously. The interval can be freely set such that it can be made dependent on the general condition of the network, traffic amount and the like.

The results of the decision may be sent to the network nodes and the network nodes may update routing tables correspondingly. Thus, the information regarding the decision on the virtual direct connections can be translated in the routing tables of the network nodes.

BRIEF DESCRIPTION OF THE DRAWINGS

The present invention will be more readily understood with reference to the accompanying drawings in which:

FIG. 4(a) to (d) show performance parameter normalization, combination and quantization according to the embodiment;

DETAILED DESCRIPTION OF PREFERRED EMBODIMENTS

In the following, a preferred embodiment of the invention is described in more detail with reference to the accompanying drawings. The method according to the present embodiment is proposed as a solution for IPv6-over-IPv4 automatic tunnelling with dynamic performance optimisation. In this description, this procedure is called Dynamic Tunnel Peering with Performance Optimisation based on End-to-end Measurement, which is abbreviated as DTP-POEM. Moreover, the terms "Virtual Network/Base Network" are equivalent to IPv6/IPv4 throughout the description of the first embodiment. Nevertheless, it is noted that the invention is applicable also to other types of networks (e.g., VPN) and not only to IPv6/IPv4 Internet.

In detail, the present embodiment provides a scheme to connect IPv6 sites over IPv4 networks via tunnels with dynamic performance optimisation. So-called peers (or Tunnel Peers) act as the endpoints of IPv6-to-IPv4 tunnels and as the routers in the IPv6 virtual network. Whether a Tunnel Peer plays the role of router in IPv4 network is not concerned by the invention. The peers are also referred to as network nodes.

This procedure according to the present embodiment is typically an inner-domain solution for automatic and dynamic tunnelling with performance optimisation.

The procedure according to the embodiment is applied to the following environment:

1.) The above-described peers are geographically scattered on a heterogeneous infrastructure, and the end-to-end paths among them vary in performance. Furthermore, the end-to-end performance is significantly impacted by the traffic load fluctuation on the base network.

2.) Peers that play the role of forwarding nodes in the virtual network are mostly end systems in the base network, then their computing resources are not dedicatedly designed for tunnelling nor routing.

A dedicated server (which is also referred to as a network configuration control element), named Tunnel Arbiter (TA), is defined as the core component of the architecture, which makes decision for tunnelling and routing so that congested (or poorly behaving) paths among the peers would be excluded from the set of logical links. All the tunnel end points are in peer relationship, i.e. there is not server-client differentiation.

Figure 1A:
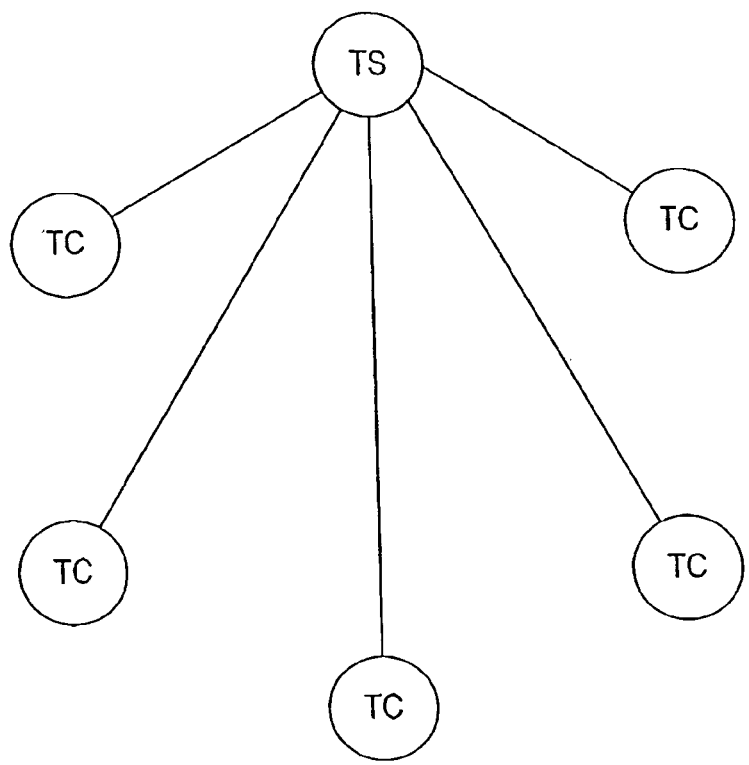
FIG. 1(a) and (b) show differences between the Tunnel Broker concept and the Tunnel Peers of the concept according to an embodiment of the invention.

The general structure of the tunnels are shown in FIG. 1, in which also the differences to the Tunnel Broker concept are illustrated. FIG. 1(a) shows the Tunnel Broker concept. There are a plurality of Tunnel Clients (TC) all connected to a central Tunnel Server (TS). There are no virtual links between the TCs, but only tunnel between each TC and the Tunnel Server.

Figure 1B:
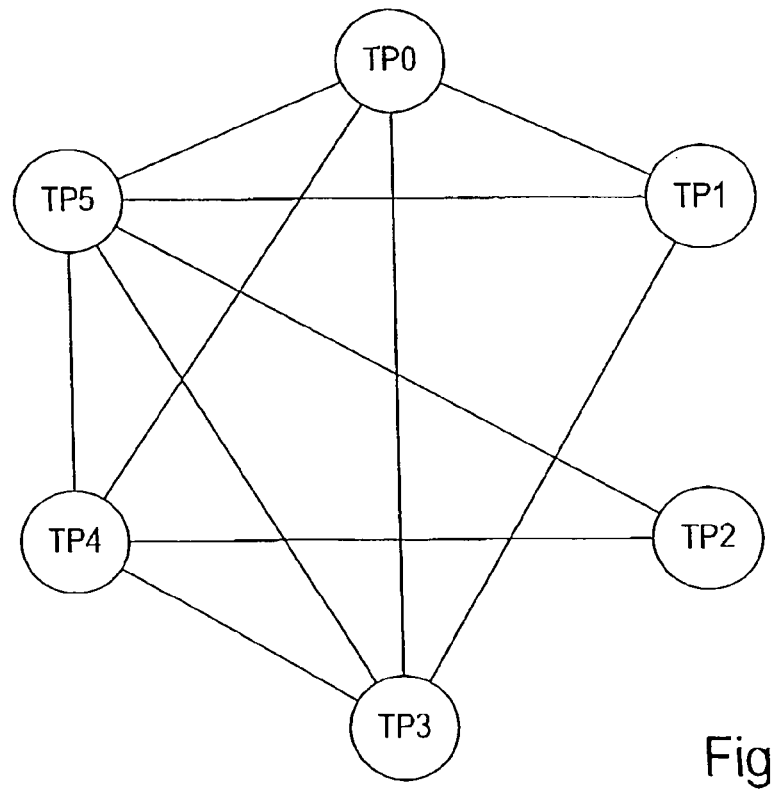

On the other hand, referring to FIG. 1(b), in the Dynamic Tunnel Peering Model according to the present embodiment there is no central point for the connections, and the Tunnel Peers (TP) automatically create tunnels on demand, as described in detail in the following.

According to the present invention, a Tunnel Peer (TP) can get the list of other peers from the Peer Registration Database (PRD) on the Tunnel Arbiter. Peers then measure performance parameters for the end-to-end paths from each to other and send the quantized and normalized values to the Tunnel Arbiter that calculates the optimised topology. Altering the tunnel virtual links along with the calculation is performed periodically.

The following effects are achieved by the dynamic Tunnel Peering architecture based on End-to-end performance measurement according to the present embodiments:

1.) A dynamic tunnel creation and deletion mechanism is introduced to fit the performance distribution over the IPv4 base network.

2.) End-to-end performance is quantized to dimensionless integer values so that the state is finite and the topology would not allergic to slight disturbances.

3.) The tunnel decisions, determined by all-pairs shortest path (APSP) criterion in terms of virtual link performance, contain the routing information as well.

Figure 2:
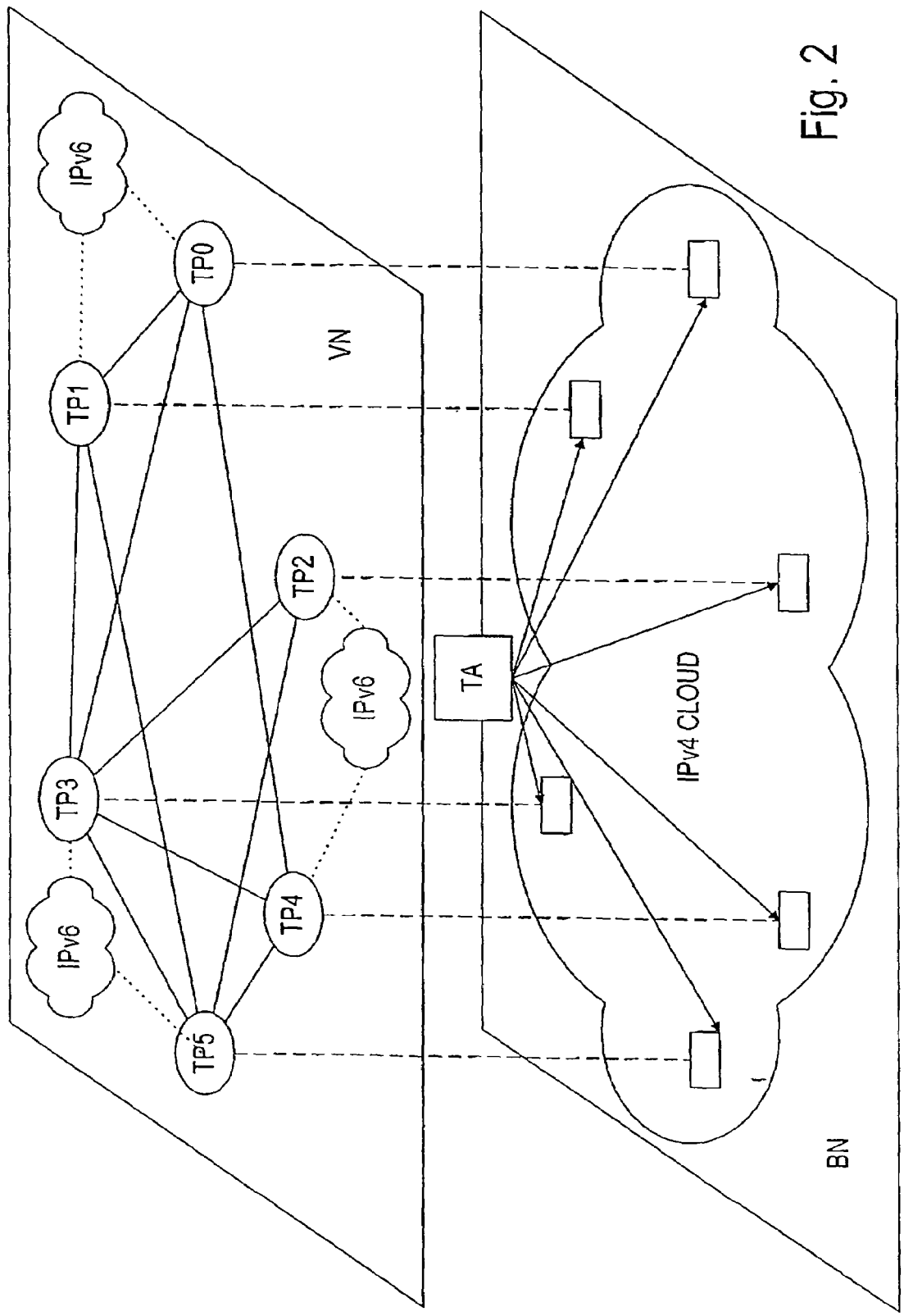
FIG. 2 shows a dynamic Tunnel Peering architecture according to the embodiment.

Conceptually, there are two planes of network in the DTP-POEM architecture. This is illustrated in FIG. 2. On the bottom, there is the base network, which is according to this embodiment the IPv4 Internet. The base network provides a global connectivity with a deployed physical infrastructure. Each Tunnel Peer (indicated by reference sign TP in the figure) is projected onto a node in the base network. These nodes have IPv4-only communication with the Tunnel Arbiter (TA) described above.

On the upper level, there is a virtual network plane, in which all the links are logical. The logical links would be controlled by the Tunnel Arbiter and updated when the performance condition changes on the Base Network plane. As shown in FIG. 2, all Tunnel Peers have connection to the global IPv6 Internet. Each Tunnel Peer might be connected to an individual isolated IPv6 site, or two or more Tunnel Peers may be connected to such an individual IPv6 site. Within such an isolated IPv6 site, more inner-IPv6 routers may be provided for relaying data packets. In addition, the above Tunnel Peers could play the role of the relay sites for the other peers.

It is noted that the Tunnel Peers (TPs) are routers in IPv6 but not necessarily so in IPv4. In FIG. 2, there are two planes representing IPv6 virtual network layer and the IPv4 network layer, respectively, as described above. A Tunnel Peer plays the role of a router in the virtual network layer (shown as an ellipse) while it might be a simple host in the IPv4 network (shown as a box). IPv4 routers which deliver packets among those "boxes" (i.e., the nodes in IPv4 corresponding to the TP in IPv6) are not drawn in FIG. 2, because they are not concerned in the invention.

In the following, the procedure according to the present embodiment is described in more detail by referring to a procedure flow of the system, end-to-end measurement methodology, tunnel command delivery and so forth.

1. Basic Procedure Flow

The basic working procedure flow of the Dynamic Tunnel Peering based on End-to-end Performance Measurement (DTP-POEM) according to the present embodiment is described in the following by referring to the flow chart shown in FIG. 3.

a) In step S1, a node with dual stack submit its registration information to the TA to get a TP identifier. A node with a dual stack is a node having a two protocol stacks and is capable of serving base network and virtual network. That is, according to the present embodiment, such a node has protocol stacks for the IPv4 Internet and the IPv6 Internet.

As a result of the registration, the node is designated as a Tunnel Peer (TP) and gets the TP identifier which identifies it uniquely as a Tunnel Peer.

A registration entry for each TP include at least: a) a unique identifier (i.e., the TP identifier); b) the IPv4 address of the TP; c) an IPv6 address of the TP; d) the IPv6 address prefix that the TP holds; etc. The Ipv6 address prefix (or address block) is a set of contiguous IPv6 addresses. An example for such an address prefix is 3ffe:3211::/32.

b) In step S2, the TA maintains all the registration information for the TPs in a dedicated database. The registration contains at least TPs' addresses on the base network (BN), i.e. the IPv4 addresses of the TPs.

c) In step S3, each TP gets the IPv4 addresses of the other TPs from the TA. In turn, each TP then performs end-to-end measurements in step S4. The result is normalised and quantized in step S5. Thereafter, the quantized result is sent to the TA in step S6.

d) In step S7, the TA generates a weighted complete graph with all TP as its vertices according to the measurement result sent by all the TP. Then, in step S8, APSP (All-Pair-Shortest-Path) algorithm is taken to get the optimised virtual topology.

e) In step S9, the TA sends information corresponding to the optimised virtual topology to the TPs. That is, the TA sends a tunnel arbiter command to the TPs so that they tune the tunnel links among them automatically, the routing table in the TPs being updated accordingly as well, in step S10.

It is noted that the IPv6 routing tables of the TPs are updated. The Tunnel Arbiter does not give any information to IPv4 routers. Namely, only the virtual connections are optimised, the performance of the IPv4 routers within the IPv4 network are not a concern of the present invention.

f) The system repeats the steps S2 to S10 (the processes b)-e)) periodically or by some trigger like adding a new node to the network. An example of a reasonable period of the update is 30 minutes. That is, in step S11 the process waits for such a predetermined period and returns to step S2.

The system details regarding the measurements and processing of the measurements etc. are described in the following four subsections.

2. End-to-end Performance Measurement

A TP can send a request to the TA for a list of all the peers and then make the end-to-end performance measurement.

End-to-end performance measurement methodology is out of this application. The implementer could follow for instance the document "Framework for IP Performance Metrics", RFC 2330, by V. Paxson, et al. May 1998. Alternatively, also other measurement methods could be used as well. The parameter selection depends on the network design criteria. For general purpose, considering the simplicity of the measurement operation, round-trip delay is accepted. Such a round-trip delay is described in "A Round-Trip Delay Metrics for IPPM", RFC 2681, by G. Almes, S. Kalindini, M. Zekauskas, September 1999 (IPPM stands for IP (Internet Protocol) Performance Metrics). A type-P-Round-Trip-Delay metric could be measured by the ICMP echo request/reply with dedicated packet length. This could be done with a well known "ping" procedure. Preferably, a customized "ping" process should be coded within the TP program suite instead of using the "ping" tool provided by the Operating Systems in order to have an optimum compatibility to the performance measurement actually performed.

In this example the result of the end-to-end measurement is sent to the TA with UDP protocol (User Datagram Protocol).

3. Parameter Normalization, Combination and Quantization

The system must take account of the trade-off between the simplicity and the effects. That is, it should be avoided to have a great expenditure for achieving the desired effects. Thus, according to the present embodiment, preferably the TPs get the parameter value in a simple manner, e.g., just "ping" a several times and have the average RTT and the packet loss rate measured in this manner. Then, normalization functions reshape the delay and packet loss rate value into non-dimensional values such that their addition operation (i.e., a suitable combination of delay and packet loss rate) conforms to physical facts as a well-defined weight function.

Obviously, the normalization function for the RTT delay should be linear. This invention suggests defining a cut-off threshold, e.g. 3000 ms (or other suitable values), for the normalization function, implying that the system will see a virtual link is unreachable if the RTT delay on it exceeds the threshold. This is illustrated in FIG. 4(a), in which the RTT delay RTT is shown on the abscissa, and the RTT delay performance value d is shown on the ordinate. Then we have $$d(RTT) = \begin{cases} RTT/M & \forall\, 0 < RTT \leq M \\ 1 & \forall\, RTT > M \end{cases}$$

where M is the threshold for "unreachable".

The case is different for the packet loss rate (defined as number of lost packets/number of all transmitted packets, usually given in %). For example, it is assumed that there are three Tunnel Peers TP1, TP2 and TP3. If the packet loss rate PLR from TP1 to TP2 is x while that from TP2 to TP3 y, then the packet loss rate from TP1 to TP3 via TP2 should be 1−(1−x)(1−y). Then, according to the present embodiment, a function r(PLR) for packet loss rate normalization is as follows:

$$r(PLR) = \begin{cases} \log_{1-p}(1-PLR) & \forall\, 0 \leq PLR < p \\ 1 & \forall\, p \leq PLR < 1 \end{cases}$$

where p(0<p<1) is the packet loss rate threshold for "unreachable". This is illustrated in FIG. 4(b), in which the packet loss rate PLR is shown on the abscissa, and the packet loss rate performance value r is shown on the ordinate.

The combination function then provides adaptive weights making the delay and packet loss rate values to a single one. It is required that the combinated value would be linear to one of the delay or packet loss rate value, if the other one were zero. Furthermore, the combination function should keep the "unreachability" still. Thus, the invention takes the following function to play the role of combination, i.e.

$$u(d, r) = \begin{cases} qd + (1-q)r, & \forall\, 0 \leq d, r < 1; \\ 1, & \text{if } \max\{d, r\} = 1. \end{cases}$$

where the constant 0<q<1 is the relative importance of delay to packet loss rate. Generally, it takes $$q = \frac{1}{2}.$$

(FIG. 4(c))

Finally, the parameter values would better be quantized into small integer so that the transmission overhead between the TA and TPs would be as light as possible. The APSP calculation on a integer-weighted complete graph would be far faster than that on a float-weighted one as well. More importantly, quantization prevents frequent updating of dynamic performance state information. Especially, the "unreachable" is quantized to a saturated value which means an "infinite" weight. This is illustrated in FIG. 4(d) and in the following formula, in which the integer value v is generated from the combined performance value u.

$$v = \begin{cases} 1 & \forall\, 0 \leq u < 0.1 \\ 2 & \forall\, 0.1 \leq u < 0.2 \\ 3 & \forall\, 0.2 \leq u < 0.3 \\ \ldots & \\ 10 & \forall\, 0.9 \leq u < 1 \\ 255 & \forall\, u = 1 \end{cases}$$

It is noted that here values 1 to 10 are associated to the floating-point values of u in steps, whereas for the "unreachable" or unusable 255 is associated.

4. Solving the APSP Problem

By using the quantized and normalized performance values v determined in the manner described above, the weighted complete graph can be created by the TA. The values can also be used to generate a corresponding weighted adjacency matrix. In such a weighted adjacency matrix, an element a(i,j) defines the performance value v between a Tunnel Point TPi and a Tunnel Point TPj, wherein the performance value is also directed in this way, i.e., form TPi to TPj. In the matrix, the value i identifies the column of the matrix and j identifies the row, i and j being integers.

As long as the weighted complete graph has been created by the TA, any APSP algorithm could be applied to calculate the optimized subgraph. The originally generated complete graph is directed. The measurements are taken in a round-trip way and accordingly the weighted adjacency matrix for the graph should be symmetric with respect to its diagonal. Sometimes, however, the matrix may be really asymmetric in practice due to the measurement errors and the asymmetric dynamic conditions between the two ends of a pair. That is, a(i,j) may be unequal to a(j,i). Therefore, supposing A be the originally measured adjacency matrix, we define a new adjacency matrix W such that $$w(i,j)=w(j,i)=a(i,j)+a(j,i).$$

The matrix W is definitely symmetric and the calculation would be taken on it instead of A.

One can use Floyd-Warshall APSP algorithm to solve the APSP problem described with the matrix above. The Floyd-Warshall algorithm is described by E. Minieka in "Optimization Algorithms for Networks and Graphs", Marcel Dekke, Inc. 1978, ISBN 0-8247-6642-3. The algorithm could be coded in C language as follows:

Alg.1:Floyd-Warshall APSP Algorithm:

N: the number of vertices
W: the adjacency matrix of the weighted complete graph, initialised with the weights
P: the predecessor matrix for the optimised sub graph, initialised with −1 for all elements

```
==========================================
void FloydWarshall(int N, int *W, int *P)
{
    int i, j, k;
    for(k = 0; k < N; k++)
        for(i = 0; i < N; i ++)
```

```
        for(j = 0; j < N; j++){
            if (W[i*N+j] > W[i*N+k] + W[k*N+j]){
                W[i*N+j] = W[i*N+k] + W[k*N+j];
                P[i*N+j] = k;
            }
        /* For the matrix W is symmetric, the initial value of j could be
           set to i.
        */
}/* Floyd Warshall */
```

It is noted that W and P are treated as one-dimensional array fields, such that all N (number of vertices) rows of the corresponding matrices are rewritten into one row.

After the algorithm has been executed, the predecessor matrix P is sufficient for determining the next hop route for each vertex and therefore the TA can provide routing information to the TPs along with the tunnel commands. A simple algorithm calculating the next-hop from any source to a destination is designed by the invention as below. If the TA maintain the information on virtual network blocks associated with each TP, then a NextHop method described in the following could be applied to create the routing table dynamically.

Alg.2: Creating the Routing Table with the P Matrix:
N: the number of vertices
P: the predecessor matrix for the optimized subgraph
u, v: the identifier of the source and the destination

```
int NextHop(int N, int *P, int u, int v)
{
    int k, r;
    k = P[u*N+v]; r = u;
    while (k != -1){
        r = k;
        k = P[u*N+k];
    }
    return r;
}/* NextHop */
```

It is clear that the NextHop method for a certain source node doesn't involve rows for other peers. Thus the algorithm can be executed at each TP separately.

5. Tunnel Decision Making

Solving the APSP problem results in the optimised predecessor matrix P. According to this matrix, the TA can be easily get the virtual network topology by removing those virtual links whose corresponding value in the matrix P is positive. That is, an unchanged value −1 represents a tunnel link of the virtual network while any positive value indicates forward relaying. This matrix can be seen as the global tunnel decision and the k-th row of P is the decision for k-th TP. Then the TA sends decisions to the TPs respectively. A decision contains both tunnel and routing information. The latter one could be decoded into a routing table with the NextHop process mentioned above.

An example is given in the following by referring to FIGS. 3 and 5 to 7.

It is assumed that there are six IPv6 sites which will be connected via the DTP-POEM system according to the embodiment.

a) Registration

Figure 3:
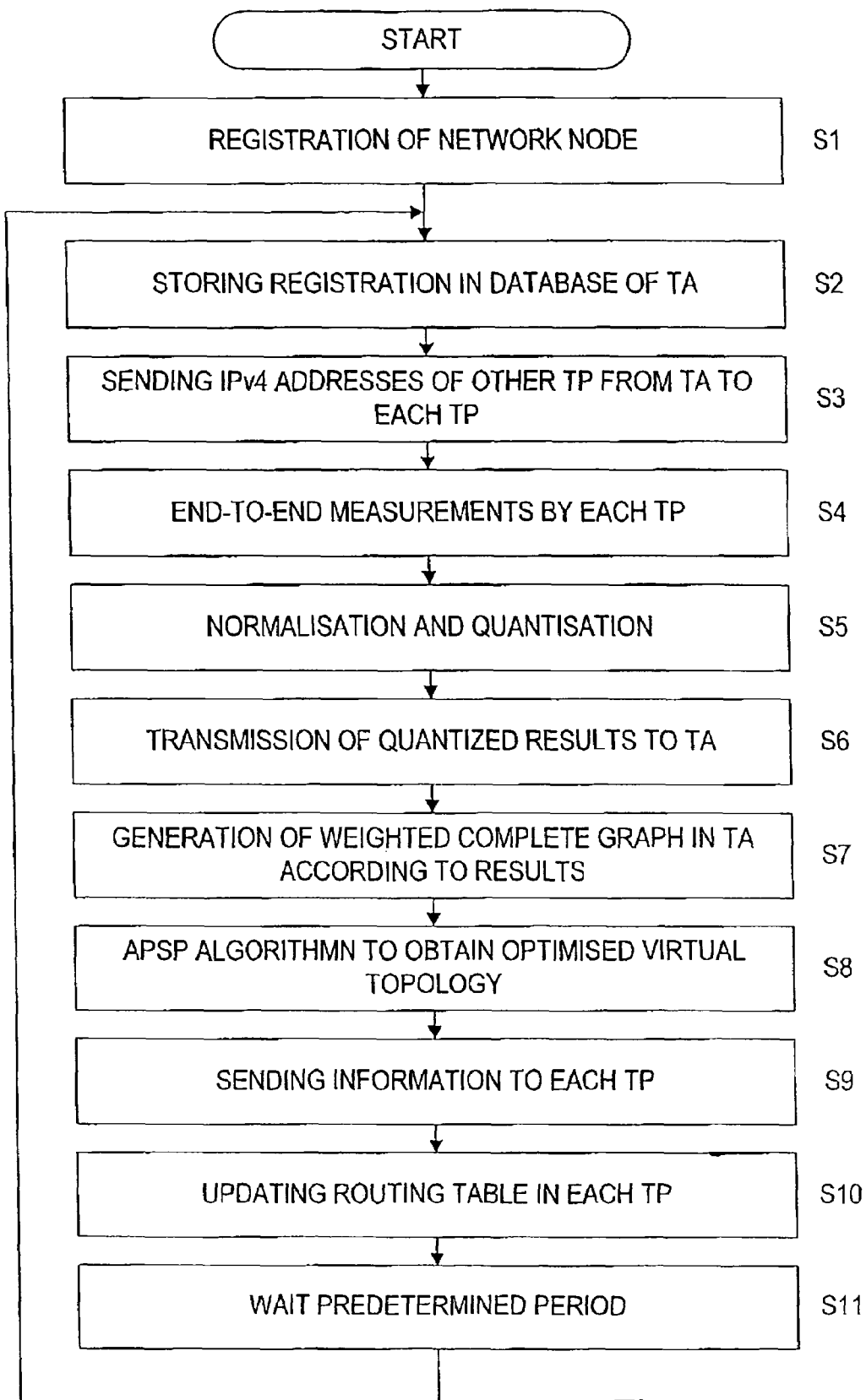
FIG. 3 shows a flowchart of the basic work procedure flow according to the embodiment.

An end point of each site send its registration to the Tunnel Arbiter, getting its own Tunnel Peer ID and a list of all peers (steps S1 to S3 in FIG. 3).

b) Measurement

Figure 5A:
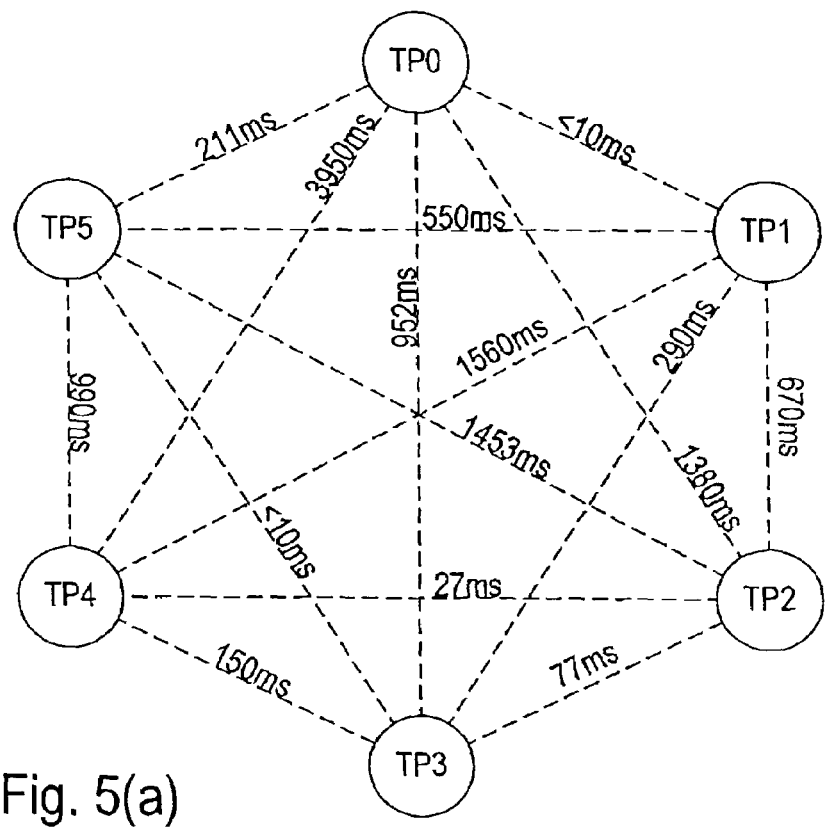
FIGS. 5(a) and (b) show an example for end-to-end performance measurements result of RTT (Round Trip Time) delay and packet loss rate according to the embodiment.
Figure 5B:
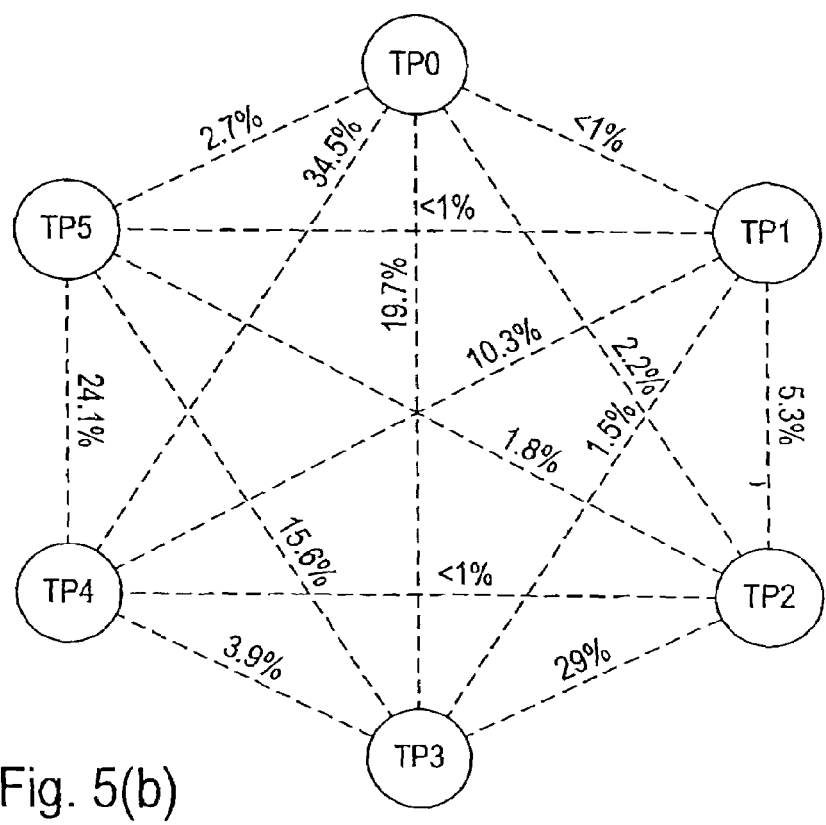

Each TP makes measurement on end-to-end performance (step S4 in FIG. 3), resulting in a complete graph with performance parameters on the edges, when considering the measurements of all TPs. The result is shown in FIG. 5(a) regarding the RTT delay, and in FIG. 5(b) regarding the packet loss rate (PLR).

c) Normalization and Quantization

Figure 6:
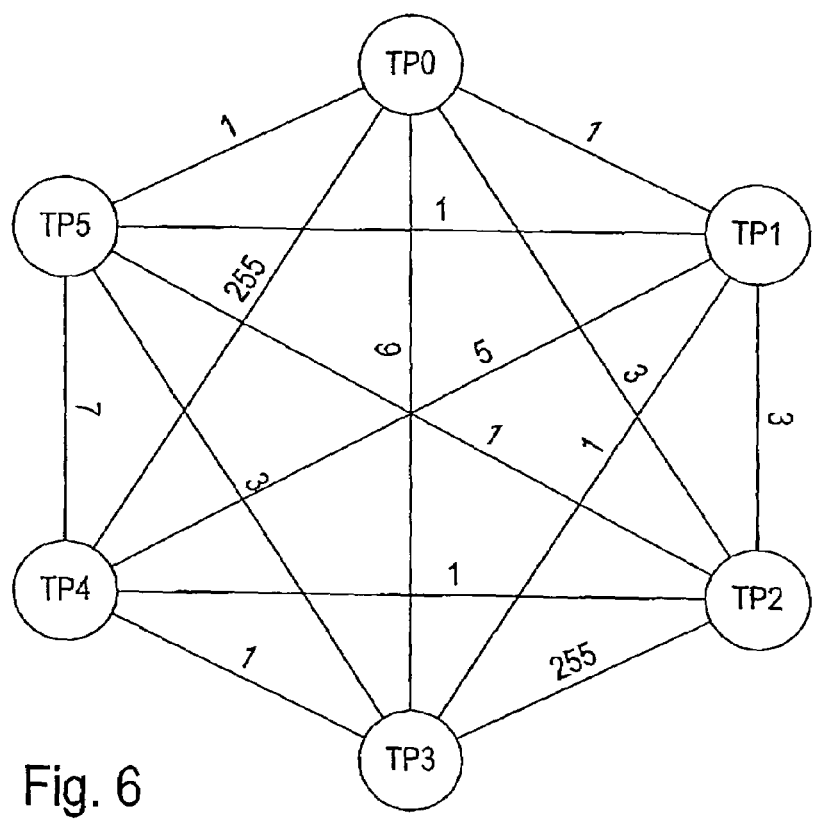
FIG. 6 shows an example for the weighted complete graph.

Each TP normalizes performance values, combines delay and packet loss rate and then quantizes the non-dimensional value into a small integer before sending them to the TA (steps S5 and S6 in FIG. 3). As the result, the TA constructs a weighted complete graph (step S7 in FIG. 3). The result is shown in FIG. 6, wherein the adjacency matrix of the weighted complete graph is as follows:

| W | 0 | 1 | 2 | 3 | 4 | 5 |
|---|---|---|---|---|---|---|
| 0 | 0 | 1 | 3 | 6 | 255 | 1 |
| 1 | 1 | 0 | 3 | 1 | 5 | 1 |
| 2 | 3 | 3 | 0 | 255 | 1 | 1 |
| 3 | 6 | 1 | 255 | 0 | 1 | 3 |
| 4 | 255 | 5 | 1 | 1 | 0 | 7 |
| 5 | 1 | 1 | 1 | 3 | 7 | 0 |

For example, the tunnel between TP0 and TP4 shows a RTT delay time of 3950 ms. Thus, it is higher than the threshold M of 3000 ms. Hence, this tunnel is determined as being unusable, i.e., TP4 is unreachable for TP0 via a direct tunnel. Therefore, the corresponding entry in the above adjacency matrix is 255 (w(0,4)).

As another example, the packet loss rate PLR between TP2 and TP3 is 29%. Thus, it is higher than the threshold p, which may be set to 20%. Hence, also this tunnel is determined as being unusable, and, therefore, the corresponding entry n the above adjacency matrix is 255. (w(2,3)).

d) Calculation

The TA calculates the APSP problem to get the optimisation. The result is represented with a predecessor matrix (as described above) and each row in the matrix is the decision for the corresponding TP. The predecessor matrix is as follows:

| P | 0 | 1 | 2 | 3 | 4 | 5 |
|---|---|---|---|---|---|---|
| 0 | -1 | -1 | 5 | 1 | 3 | -1 |
| 1 | -1 | -1 | 5 | -1 | 3 | -1 |
| 2 | 5 | 5 | -1 | 4 | -1 | -1 |
| 3 | 1 | -1 | 4 | -1 | -1 | 1 |
| 4 | 3 | 3 | -1 | -1 | -1 | 2 |
| 5 | -1 | -1 | -1 | 1 | 2 | -1 | e) Execution

Getting the tunnel and routing decision from the TA, a TP updates its tunnel interface configuration and then modifies the routing table with the Alg.2 (i.e., the NextHop routine described in the foregoing). The highlighted entry in the predecessor matrix (i.e., the first row of the predecessor matrix) refers to the tunnel and routing decision for TP0. This decision is translated into the routing table of TP0 as shown in the following:

|  | Tunnel decision | | | | | |
| --- | --- | --- | --- | --- | --- | --- |
|  | 0 | 1 | 2 | 3 | 4 | 5 |
| Peer Tunneling? | — | Y | N | N | N | Y |

|  | Routing table of TPO | | | | | |
| --- | --- | --- | --- | --- | --- | --- |
| Destination | 0 | 1 | 2 | 3 | 4 | 5 |
| Next hop | 0 | 1 | 5 | 1 | 1 | 5 |

Figure 7:
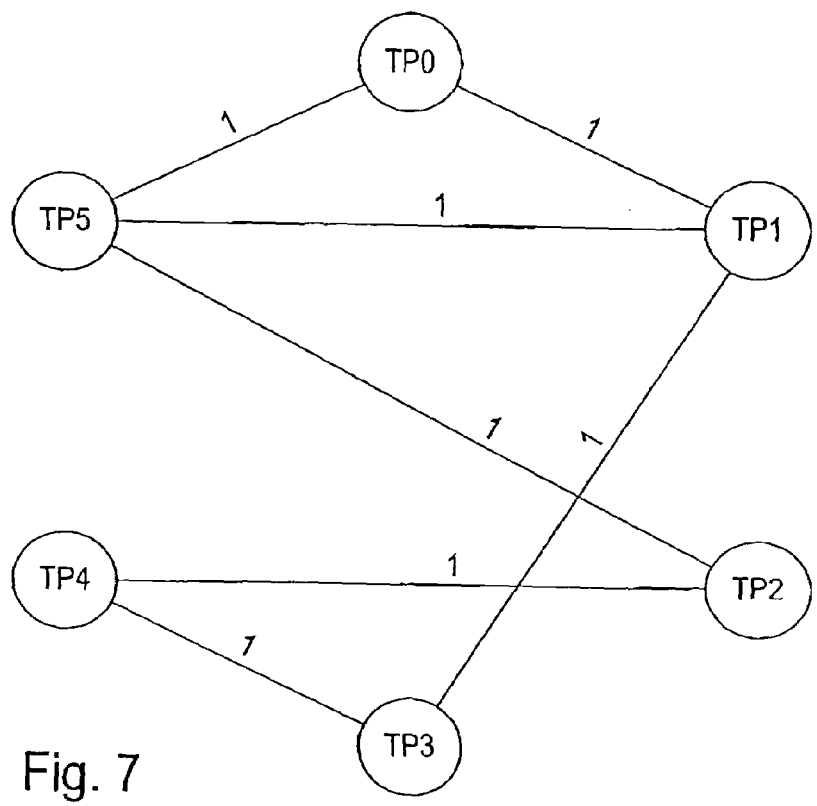
FIG. 7 shows an optimised subgraph according to the present embodiment.

The corresponding optimised subgraph is shown in FIG. 7. In this example, direct connections (i.e., tunnels) are only provided between TP0 and TP1 TP0 and TP5, TP5 and TP1 TP1 and TP3, TP2 and TP5, TP4 and TP2 and between TP3 and TP4.

Thus, when considering TP0 (first entry, i.e., first row or first column in the above predecessor matrix), direct tunnelling is performed only to TP1 and TP5. Tunnelling to TP2 is performed via TP5 as the next hop (entry in the predecessor matrix in column 2 corresponding to TP2). Tunnelling to TP3 is performed via TP1 as the next hop. Tunnelling to TP4 is performed via TP3, that is, the next hop is TP1 and then TP3.

When a new period is coming, the TPs check the peer list and start up a new round of measurement activities.

To implement the invention, many parameters and methodologies mentioned above should be negotiated in advance. Preferably, a protocol document should be edited, defining data formats and common rules that the TA and all TPs should follow.

With respect to the complexity of the computation, it is advantageous to avoid floating-point computing as much as possible. According to the present embodiment, the performance values are transmitted as integers. In addition, a table-scan method can be applied for calculating the logarithmic values in order to further reduce the calculation load.

Moreover, in order to decrease the overhead traffic, according to the present embodiment a "keep-alive" approach is used. That is, if the decision for a certain TP does not have to be changed, then a simple keep-alive message instead of an entire decision is sent to the TP. A further measure to minimize the traffic of performance values is a periodic update/keep-alive mechanism. That is, according to the present embodiment a predetermined period of time is waited for between two decisions. As described above, the predetermined period could be 30 minutes, for example.

TPs are heterogeneous and are working in a peer mode. However, as an alternative, allowing for the reliability, introducing credible Tunnel Servers may enhance the robustness of the entire system. Preferably, the Tunnel Server is selected among the Tunnel Peers instead of being dedicated by the Tunnel Arbiter permanently. Anyway, stable, high-performance in computing, high-speed in global connection and always-on TPs are preferred.

The TA is a dedicated server. Preferably, a relational database system is used to maintain the TP registration and tunnel states. The TA may run a HTTP (Hyper-Text Transfer Protocol) daemon as well so that any user can easily register into the DTP-POEM system and the running topology as well as its overall performance level is visualized.

Thus, according to the invention, the tunnel concept presents not only a way for connectivity, but also a way to build a dynamic virtual topology as well as the corresponding routing tables, providing services better than the legacy best-effort, steering the virtual network clear of the most congested path on the IPv4 Internet.

As described above, the invention provides a inner-domain solution for automatic tunnelling with performance optimisation. IPv6 network sites should be connected via tunnel virtual links when the global IPv6 infrastructure has not been deployed.

The earlier solutions such as 6to4 and Tunnel Broker provide only virtual network connectivity without performance consideration. This invention provides a way to make a virtual topology in a better manner such that most congested or worst delaying end-to-end paths would not be singled out into the set of the virtual links. Moreover, the solution is dynamically adaptive, i.e. fits the performance variation on the base network and provide a best virtual topology moment by moment. Topology optimisation based on quantized end-to-end behaviour measurement are in particular advantageous.

Thus, according to the invention, the Tunnel Arbiter (TA, an example for a network configuration control element) takes the data about the end-to-end performance and makes decisions on whether a tunnel should be created between a certain pair of tunnel peers and how each tunnel peer sets its routing table (i.e., the IPv6 routing table).

The advantages achieved by the invention are as follows:

The worst logical links for virtual networking are excluded, according to current end-to-end performance on the base network.

Redundancy in peers' mutual connectivity is provided, without a vulnerable central point on the Tunnel Server, as in the Tunnel Broker architecture. Furthermore, the same redundancy is provided to the peers' connectivity to the global IPv6 Internet as long as more than one peers have been universally connected. (FIG. 1)

Although the Tunnel Peers may tunnel to each other, they do this only when necessary, that is "tunnelling on demand". If the existing virtual links have provided a path for two nodes and the path's overall performance is better than that of the direct virtual link between them if there were such one, then the direct virtual link would not be included in the virtual topology.

A centralized calculation taken by the Tunnel Arbiter component makes a real-time global optimisation, tuning the topology to conform to the base network performance variation in time.

It is not necessary to have a special address space defined for this approach, as in the 6to4 architecture.

In the worst case, the architecture presented by this invention can create a topology with adequate connectivity.

The above description and accompanying drawings only illustrate the present invention by way of example. Thus, the embodiment may vary within the scope of the attached claims.

For example, according to the above-described embodiment, the method is applied to IPv6 Internet via IPv4 Internet. However, the invention can also be used in other virtual link networks, such as VPN (Virtual Private Network), IP RAN (Internet Protocol Radio Access Network), All-IP, etc.

Moreover, for the APSP problem the Floyd-Warshall algorithm is used according to the present embodiment because it is simple and most comprehensible. Nevertheless, alternatively also other algorithms may be used, for example as described in U. Zwick, "All Pairs Shortest Paths Using Bridging Sets and Rectangular Matrix Multiplication", August 2000.

Furthermore, according to the embodiment, the Tunnel Arbiter (TA, the network configuration control element) is a separate network element. However, the function of the Tunnel Arbiter may be embedded in other network elements.

Moreover, in order to avoid or to minimise loss of packets during changing of the tunnels, a seamless switch technique may be applied, and the quantization keeps the topology stable and robust Moreover, it is noted that the above embodiment was described on a case where two different network types are concerned, namely IPv6 and IPv4. However, it is also possible to provide virtual direct connections (tunnels) in the same network type, e.g., IPv4 tunnels over an IPv4 network.

What is claimed is:

1. A method, comprising:
   performing quality measurements of the virtual direct connections between each pair of a plurality of network nodes; and
   deciding, based on the results of the quality measurements, whether a virtual direct connection is to be used to convey data or not,
   wherein the results of the quality measurements are transmitted to a network configuration control element which performs the deciding, and
   wherein the quality measurements comprise a measurement of a data loss rate on a virtual direct connection between two network nodes.

2. The method according to claim 1, wherein in the deciding, when it is decided that between two network nodes no virtual direct connection is usable, a route between these two network nodes via at least one other network node is determined based on the results of the quality measurements.

3. The method according to claim 1, wherein the network nodes are tunnel-end-points and the virtual direct connection between each pair of the network nodes are tunnels, the tunnels providing virtual connections between the nodes by encapsulating a first type network protocol within data carried by a second type network.

4. The method according to claim 1, wherein the quality measurements are performed by each network node with respect to the virtual direct connections to other network nodes.

5. The method according to claim 1, wherein the quality measurements comprise measurement of a delay time on a virtual direct connection between two network nodes.

6. The method according to claim 5, wherein a threshold for a maximum allowable delay time is set, and when a delay time on a virtual direct connection exceeds the threshold, the connection is determined as not being usable.

7. The method according to claim 1, wherein a threshold for a maximum allowable data loss rate is set, and when a data loss rate on a virtual direct connection exceeds the threshold, the virtual connection is determined as not being usable.

8. The method according to claim 1, wherein the quality measurements further comprise measurement of a delay time on a virtual direct connection between the two network nodes, and a result of the delay time measurement and a result of the data loss rate measurement are combined to a single quality measurement result.

9. The method according to claim 8, wherein the result of the delay time measurement and the result of the data loss rate measurement are respectively weighted on combining them.

10. The method according to claim 8, wherein on combining, the delay time measurement result and the packet data loss rate measurement result are normalized, respectively.

11. The method according to claim 8, wherein a threshold for a maximum allowable delay time is set, and when a delay time on a connection exceeds the threshold, the connection is determined as not being usable.

12. The method according to claim 8, wherein the single quality measurement result is converted into an integer value.

13. The method according to claim 1, wherein the measuring and the deciding are performed every predetermined interval.

14. The method according to claim 1, wherein the measuring and the deciding are performed upon triggering by an operator of the networks or upon changing the network configuration.

15. The method according to claim 1, wherein the results of the deciding are sent to the network nodes and the network nodes update routing tables correspondingly.

16. A system comprising:
    a plurality of network nodes; and
    a network configuration control element, wherein each pair of network nodes is connected via virtual direct connections,
    wherein the network nodes are configured to perform quality measurements of the virtual direct connections and to send results of the quality measurements to the network configuration control element, and
    the network configuration control element is configured to decide, based on the results of the quality measurements, whether a virtual direct connection is to be used for conveying data or not, and
    wherein the quality measurements comprise a measurement of a data loss rate on a virtual direct connection between two network nodes.

17. The system according to claim 16, wherein the network configuration element is configured to determine, when it has decided that between two network nodes no virtual direct connection is usable, a route between these two network nodes via at least one other network node based on the results of the quality measurements.

18. The system according to claim 16, wherein the virtual direct connection between each pair of the network nodes are tunnels, the tunnels providing virtual connections between the nodes by encapsulating a first type network protocol within data carried by a second type network.

19. The system according to claim 16, wherein the quality measurements comprise measurement of a delay time on a virtual direct connection between two network nodes.

20. The system according to claim 19, wherein a threshold for a maximum allowable delay time is set, and at least one of the network configuration control element and each network node is configured to determine the virtual direct connection as not being usable when a delay time on a virtual direct connection exceeds the threshold.

21. The system according to claim 16, wherein a threshold for a maximum allowable data loss rate is set, and the network configuration control element and/or each network node is configured to determine the virtual direct connection as not being usable when a data loss rate on a virtual direct connection exceeds the threshold.

22. The system according to claim 16, wherein the quality measurements further comprise measurement of a delay time on a tunnel between the two network nodes, and each network node is configured to combine a result of the delay time measurement and a result of the data loss rate measurement to a single quality measurement result.

23. The system according to claim 22, wherein each network node is configured to weight respectively the result of the delay time measurement and the result of the data loss rate measurement on combining them.

24. The system according to claim 22, wherein each network node is configured to normalize respectively the delay time measurement result and the packet data loss rate measurement result.

25. The system according to claim 22, wherein a threshold for a maximum allowable delay time is set, and the network configuration control element and/or each network node is configured to determine the virtual direct connection as not being usable when a delay time on a connection exceeds the threshold.

26. The system according to claim 22, wherein each network node is configured to convert the single quality measurement result into an integer value.

27. The system according to claim 16, wherein the network configuration control element is configured to request the quality measurement and to request the measurement and to perform the decision every predetermined interval.

28. The system according to claim 16, wherein the network configuration control element is configured to request the quality measurement and to request the measurement and to perform the decision upon triggering by an operator of the networks or upon changing the network configuration.

29. The system according to claim 16, wherein the network configuration control element is configured to send the results of the decision to the network nodes, and the network nodes are configured to update routing tables correspondingly.

30. A system, comprising:
a plurality of network nodes; and
a network configuration control element, wherein each pair of network nodes is connected via virtual direct connections,
wherein the network nodes include means for performing quality measurements of the virtual direct connections and sending results of the quality measurements to the network configuration control element, and
the network configuration control element further comprises deciding means for deciding, based on the results of the quality measurements, whether a virtual direct connection is to be used for conveying data or not,
wherein the quality measurements comprise a measurement of a data loss rate on a virtual direct connection between two network nodes.

31. An apparatus, comprising:
a connector configured to connect the apparatus via virtual direct connections to other network nodes via virtual direct connections, and the virtual direct connections are tunnels, the tunnels are configured to provide virtual connections by encapsulating a first type network protocol within data carried by a second type network; and
wherein the apparatus is configured to perform quality measurements of the virtual direct connections and to send results of the quality measurements to a network configuration control element, and
wherein the quality measurements comprise a measurement of a data loss rate on a virtual direct connection to another one of the other network nodes.

32. The network node apparatus according to claim 31, wherein the quality measurements comprise measurement of a delay time on a virtual direct connection to another one of the other network nodes.

33. An apparatus, comprising:
a controller configured to configure a network, wherein the network comprises a plurality of network nodes, wherein each pair of the network nodes is connected via virtual direct connections, the virtual direct connection between each pair of the network nodes are tunnels, the tunnels providing virtual connections between the nodes by encapsulating a first type network protocol within data carried by a second type network; and
a processor configured to decide, based on results of quality measurements performed by the network nodes, whether a virtual direct connection is to be used to convey data or not,
wherein the quality measurements comprise a measurement of a data loss rate on a virtual direct connection to another one of the other network nodes.

34. The apparatus, according to claim 33, wherein the control element further comprises a transmitter configured to request the quality measurement and to request the measurement and to perform the decision every predetermined interval.

35. The apparatus according to claim 33, wherein the controller further comprises a transmitter configured to request the quality measurement and to request the measurement and to perform the decision upon triggering by an operator of the networks or upon changing the network configuration.

36. An apparatus, comprising:
connector means for connecting the apparatus to network nodes via virtual direct connections, wherein the virtual direct connections are tunnels, and wherein the tunnels providing virtual connections by encapsulating a first type network protocol within data carried by a second type network; and
performing means for performing quality measurements of the virtual direct connections and for sending results of the quality measurements to a network configuration control element, wherein the quality measurements comprise a measurement of a data loss rate on a virtual direct connection to another one of the other network nodes.

37. An apparatus, comprising:
controller means for configuring a network comprising a plurality of network nodes, wherein each pair of the network node is connected via virtual direct connections, the virtual direct connection between each pair of the network nodes are tunnels, the tunnels providing virtual connections between the nodes by encapsulating a first type network protocol within data carried by a second type network; and
deciding means for deciding, based on results of quality measurements performed by the network nodes, whether a virtual direct connection is to be used for conveying data or not,
wherein the quality measurements comprise a measurement of a data loss rate on a virtual direct connection to another one of the other network nodes.

* * * * *